(12) United States Patent
Bresler et al.

(10) Patent No.: US 8,337,593 B2
(45) Date of Patent: Dec. 25, 2012

(54) PROCESS FOR PURIFYING NATURAL GAS AND REGENERATING ONE OR MORE ADSORBERS

(75) Inventors: Leonid Bresler, Northbrook, IL (US); Cedric Freeman, Houston, TX (US); Keith R. Clark, Santa Fe, NM (US)

(73) Assignee: UOP LLC, Des Plaines, IL (US)

( * ) Notice: Subject to any disclaimer, the term of this patent is extended or adjusted under 35 U.S.C. 154(b) by 295 days.

(21) Appl. No.: 12/859,166

(22) Filed: Aug. 18, 2010

(65) Prior Publication Data

US 2012/0042689 A1 Feb. 23, 2012

(51) Int. Cl.
*B01D 53/04* (2006.01)
*B01D 53/26* (2006.01)

(52) U.S. Cl. .......... 95/115; 95/124; 95/125; 95/139

(58) Field of Classification Search .......... 95/106, 95/114, 115, 117, 121, 124, 125, 139, 148; 585/820

See application file for complete search history.

(56) References Cited

U.S. PATENT DOCUMENTS

| | | |
|---|---|---|
| 3,594,983 A | 7/1971 | Yearout |
| 3,710,547 A | 1/1973 | Nelson |
| 4,061,724 A | 12/1977 | Grose et al. |
| 4,073,865 A | 2/1978 | Flanigen et al. |
| 4,310,440 A | 1/1982 | Wilson et al. |
| 4,440,871 A | 4/1984 | Lok et al. |
| 4,484,933 A | 11/1984 | Cohen |
| 4,567,027 A | 1/1986 | Detournay et al. |
| 4,775,396 A | 10/1988 | Rastelli et al. |
| 4,935,580 A | 6/1990 | Chao et al. |
| 5,089,034 A | 2/1992 | Markovs et al. |
| 5,551,256 A | 9/1996 | Schmidt |
| 5,759,236 A * | 6/1998 | Bruck et al. ............ 95/41 |

(Continued)

FOREIGN PATENT DOCUMENTS

EP 1027913 A1 * 8/2000

(Continued)

OTHER PUBLICATIONS

Diagram of an Adsorptive Process for Removal of Water and Carbon Dioxide publicly disclosed in the United States in 2008. A Dryer is Regenerated During Regeneration of an Adsorber in a Heating Stage.

*Primary Examiner* — Frank Lawrence, Jr.
(74) *Attorney, Agent, or Firm* — Mark Goldberg

(57) ABSTRACT

One exemplary embodiment can be a process for purifying a natural gas by using first and second adsorbers. The process may include passing a feed including the natural gas through the first adsorber to obtain a purified natural gas product, regenerating the second adsorber in a heating stage, and regenerating the second adsorber in a cooling stage. The heating stage may include separating a portion of the feed comprised in a regeneration gas, passing the regeneration gas to a dryer for removing water, heating the regeneration gas with a heater after exiting the dryer, and passing the regeneration gas to the second adsorber to regenerate the second adsorber. The cooling stage may include expelling at initiation of cooling at least a part of a fluid present in the second adsorber to the dryer to desorb water from a molecular sieve in the dryer, and cooling the second adsorber by circulating the regeneration gas bypassing the heater.

17 Claims, 1 Drawing Sheet

U.S. PATENT DOCUMENTS

| | | | |
|---|---|---|---|
| 5,779,768 A * | 7/1998 | Anand et al. | 95/99 |
| 5,846,295 A * | 12/1998 | Kalbassi et al. | 95/105 |
| 6,099,620 A * | 8/2000 | Arno et al. | 95/121 |
| 6,387,337 B1 | 5/2002 | Pennline et al. | |
| 7,000,332 B1 * | 2/2006 | Fresch et al. | 34/330 |
| 7,231,784 B2 | 6/2007 | Howard et al. | |
| 7,449,049 B2 * | 11/2008 | Thomas et al. | 95/123 |
| 2010/0115839 A1 | 5/2010 | Brown et al. | |
| 2011/0277496 A1 * | 11/2011 | Northrop et al. | 62/611 |

FOREIGN PATENT DOCUMENTS

| | | |
|---|---|---|
| JP | 63-270522 A * | 11/1988 |
| JP | 63270522 A | 11/1988 |
| WO | 2006107349 A1 | 10/2006 |

* cited by examiner

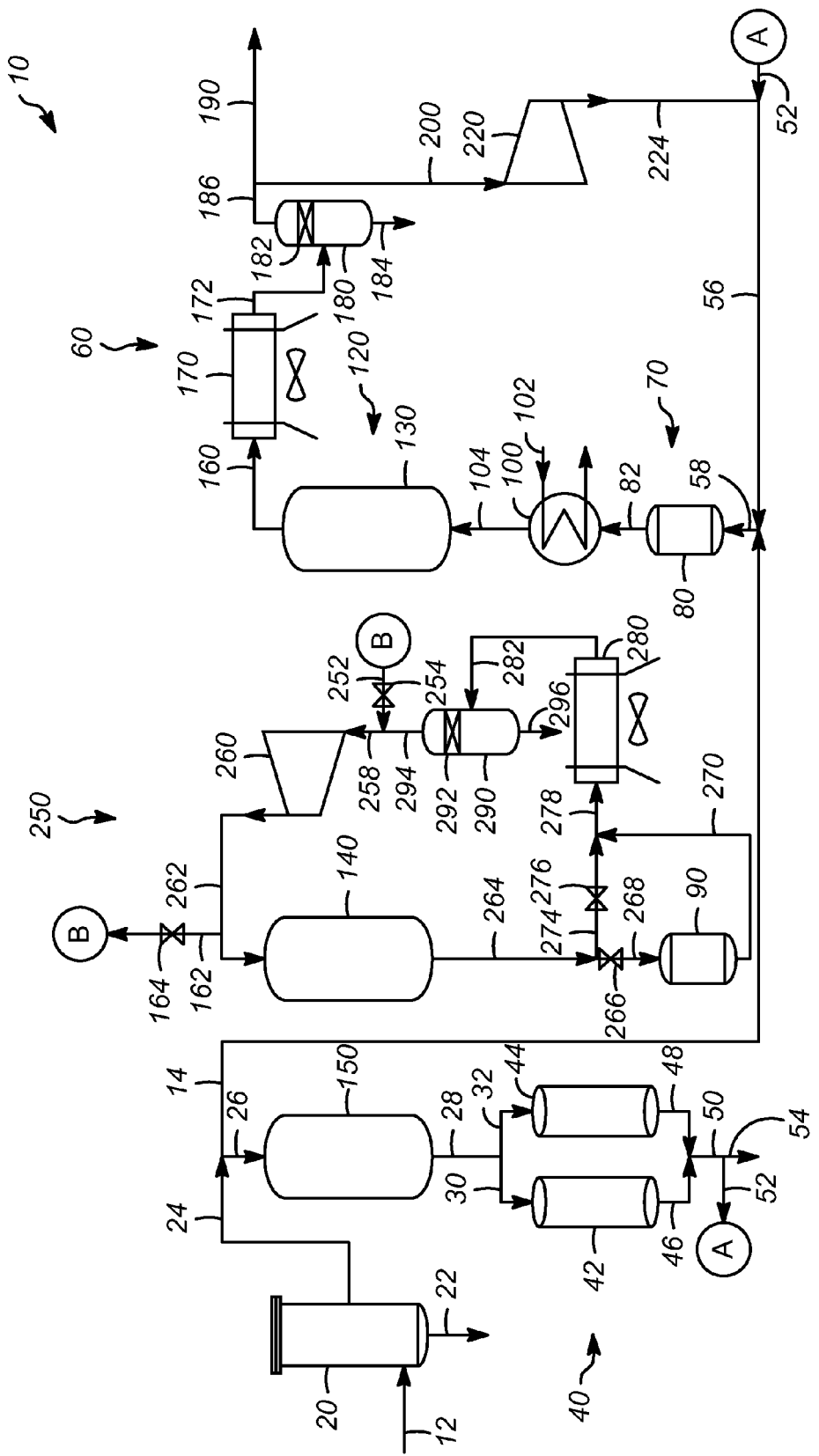

US 8,337,593 B2

PROCESS FOR PURIFYING NATURAL GAS AND REGENERATING ONE OR MORE ADSORBERS

FIELD OF THE INVENTION

This process generally relates to purifying natural gas with one or more adsorbers and regenerating the same.

DESCRIPTION OF THE RELATED ART

Natural gas, which can be obtained from off-shore sources, may be purified by adsorption with a molecular sieve. Typically, open loop regeneration is utilized due to the desire to adsorb more than one impurity, such as carbon dioxide. The use of close loop regeneration can be undesirable if other contaminants, such as water, are present due to excessive purge amounts that are generally required to remove these contaminants in the regeneration loop. Although closed loop regeneration has been proposed during the heating stage of adsorber regeneration, such closed loop systems can fail to provide sufficient flexibility for variations in contaminant levels in the natural gas. Generally, it is desirable to remove water and/or carbon dioxide from natural gas to levels that will not produce solids and/or hydrates during subsequent processing, such as liquefaction.

SUMMARY OF THE INVENTION

One exemplary embodiment can be a process for purifying a natural gas by using first and second adsorbers. The process may include passing a feed including the natural gas through the first adsorber to obtain a purified natural gas product, regenerating the second adsorber in a heating stage, and regenerating the second adsorber in a cooling stage. The heating stage may include separating a portion of the feed comprised in a regeneration gas, passing the regeneration gas to a dryer for removing water, heating the regeneration gas with a heater after exiting the dryer, and passing the regeneration gas to the second adsorber to regenerate the second adsorber. At an initiation of cooling, the cooling stage may include expelling at least a part of a fluid present in the second adsorber to the dryer to desorb water from an adsorbent in the dryer, and cooling the second adsorber by circulating the regeneration gas bypassing the heater.

Another exemplary embodiment may be a process of regenerating with a heating stage and a cooling stage for an adsorber purifying a natural gas stream. The process may include regenerating in the heating stage and the cooling stage. The heating stage can include passing a regeneration gas including a natural gas feed to a dryer for removing water, passing the dried regeneration gas to a heater, and passing the heated regeneration gas to an adsorber being regenerated. The cooling stage can include passing the regeneration gas at an initiation of cooling from the adsorber back to the dryer during regeneration to regenerate the dryer.

Yet another exemplary embodiment may be a process for a two-stage regeneration of an adsorber for removing one or more components from a natural gas. The process may include heating an adsorber with a regeneration gas including a natural gas feed in a first direction, and cooling the adsorber with the regeneration gas in another direction. Typically, an initial fluid present in the adsorber at an initiation of cooling is expelled to a dryer to regenerate a molecular sieve therein.

The embodiments disclosed herein provide a dryer utilized to remove water during a heating stage of regenerating an adsorber. During the heating stage, materials or components, such as carbon dioxide, water, and/or hydrogen sulfide, may be desorbed from the adsorber. Moreover, the dryer, in turn, may be regenerated during a cooling stage of regenerating by using fluid present in the adsorber at the initiation of cooling. As such, a closed loop regeneration can be used to minimize losses of product and/or feed natural gas used as a regeneration gas. A closed loop regeneration can also minimize energy losses by reducing the amount of make-up gas requiring compression during regeneration.

DEFINITIONS

As used herein, the term "stream" can include various hydrocarbon molecules, such as straight-chain, branched, or cyclic alkanes, alkenes, alkadienes, and alkynes, and optionally other substances, such as gas, e.g., hydrogen, or impurities, such as heavy metals, and sulfur and nitrogen compounds. The stream can also include aromatic and non-aromatic hydrocarbons. Moreover, the hydrocarbon molecules may be abbreviated C1, C2, C3 ... Cn where "n" represents the number of carbon atoms in the one or more hydrocarbon molecules. Furthermore, a superscript "+" or "−" may be used with an abbreviated one or more hydrocarbons notation, e.g., $C3^+$ or $C3^-$, which is inclusive of the abbreviated one or more hydrocarbons. As an example, the abbreviation "$C3^+$" means one or more hydrocarbon molecules of three carbon atoms and/or more.

As used herein, the term "zone" can refer to an area including one or more equipment items and/or one or more sub-zones. Equipment items can include one or more reactors or reactor vessels, heaters, exchangers, pipes, pumps, compressors, and controllers.

Additionally, an equipment item, such as a reactor, dryer, or vessel, can further include one or more zones or sub-zones.

As used herein, the term "rich" can mean an amount of at least generally about 50%, and preferably about 70%, by mole, of a compound or class of compounds in a stream.

As used herein, the term "substantially" can mean an amount of at least generally about 80%, preferably about 90%, and optimally about 99%, by mole, of a compound or class of compounds in a stream.

As used herein, the terms "adsorbent" and "adsorber" include, respectively, an absorbent and an absorber, and relates, but is not limited to, processes such as absorption and/or adsorption.

As used herein, the term "gas" can include one or more gases, liquids, and/or solids in the form of a suspension, such as an aerosol.

As used herein, the term "purified natural gas product" may refer to a natural gas that has passed through an adsorber to remove, e.g., carbon dioxide and/or water, and includes a natural gas product that has undergone subsequent processing, such as filtering of particulates.

BRIEF DESCRIPTION OF THE DRAWING

FIG. 1 is a schematic depiction of an exemplary apparatus.

DETAILED DESCRIPTION

Referring to FIG. 1, an exemplary apparatus 10 for purifying natural gas can include a filter 20, a plurality of filters 40, a plurality of dryers 70, a plurality of adsorbers 120, a cooler 170, a knockout drum 180, a compressor 220, another compressor 260, another cooler 280, and another knockout drum 290. Generally, at least some of the equipment can be included in a heating regeneration circuit 60 for a heating regeneration stage and a cooling regeneration circuit 250 for a cooling regeneration stage. Although the apparatus 10 may include two dryers, namely a first dryer 80 and a second dryer 90, and include three adsorbers, namely a first adsorber 130, a second adsorber 140, and a third adsorber 150, additional dryers and/or adsorbers can be utilized. Generally, each adsorber 130, 140, and 150 undergoes three stages, namely an adsorption stage, a heating regeneration stage, and a cooling regeneration stage. As depicted, process flow lines in the figures can be referred to, interchangeably, as, e.g., lines, pipes, feeds, streams, products, portions, or parts.

A natural gas may be utilized as a feed 12 for the apparatus 10. Typically, the feed 12 can include one or more C1-C6 hydrocarbons, preferably one or more C1-C2 hydrocarbons. Generally, the natural gas includes at least about 70%, by mole, of one or more C1 and C2 hydrocarbons, such as methane and ethane, and preferably at least about 90%, optimally about 95%, by mole, of methane. In addition to hydrocarbons, the natural gas may include nitrogen, carbon dioxide, and water. The natural gas may include no more than about 3%, by mole, preferably no more than about 2%, by mole, nitrogen; no more than about 2%, by mole, preferably no more than about 1.0%, by mole, more preferably no more than about 0.5%, by mole, and optimally no more than about 0.2%, by mole, carbon dioxide based on the moles of the natural gas; and no more than about 7,500 ppm, by volume, preferably no more than about 500 ppm, by volume, water, based on the volume of the natural gas. A natural gas may be obtained from natural sources, such as one or more wells, or synthetic sources such as one or more gasifiers or landfills.

Typically, the feed 12 can be at a temperature of about 10-about 70° C., preferably about 10-about 40° C., and a pressure of about 600-about 12,000 kPa, preferably about 600-about 6,000 kPa. Typically, the pressure in the apparatus 10 can be relatively constant.

The feed 12 can be provided to a filter 20, which in this exemplary embodiment can be a coalescer 20. The coalescer 20 can remove liquids from the feed 12, which may be in a gas phase. Generally, the liquids exit the coalescer 20 as a condensate stream 22. The remainder of the feed 12 can enter a line 24 and a portion, typically a substantial portion, may enter via a line 26 the third adsorber 150 of the plurality of adsorbers 120 and another portion may enter a line 14, as hereinafter described. The third adsorber 150 can remove water and carbon dioxide from the feed entering the third adsorber 150.

The plurality of adsorbers 120, such as the third adsorber 150, can contain any suitable adsorbent, or a combination of adsorbents to have the desired selectivity for water and carbon dioxide. Suitable adsorbents may include one or more crystalline molecular sieves, activated carbons, activated clays, silica gels, activated aluminas and combinations thereof, as disclosed in, e.g., U.S. Pat. No. 5,089,034. Molecular sieves include, for example, the various forms of silicoaluminophosphates and aluminophosphates, as disclosed in, e.g., U.S. Pat. Nos. 4,440,871 and 4,310,440.

Zeolites that may be used as adsorbents include, chabazite, also referred to as zeolite D, clinoptilolite, erionite, faujasite, also referred to as zeolite X and zeolite Y, ferrierite, mordenite, zeolite A and zeolite P. Other zeolites that may be suitable for use may be those having a high silica content, i.e., those having silica to alumina ratios greater than 10. Exemplary zeolites are disclosed in, e.g., U.S. Pat. Nos. 4,061,724, 4,073,865, 4,775,396, and 4,935,580.

Often, it is desirable to agglomerate a crystalline molecular sieve with a binder. Exemplary binders can include one or more metal oxides, clays, silicas, aluminas, silica-aluminas, silica-zirconias, silica-thorias, silica-berylias, silica-titanias, silica-alumina-thorias, silica-alumina-zirconias, and a mixture thereof. Clay binders may be preferred, and exemplary clay binders may include attapulgite, kaolin, volclay, sepiolite, polygorskite, kaolinite, bentonite, montmorillonite, illite and chlorite.

The third adsorber 150 can be operated at any suitable temperature and pressure, as disclosed above. The temperature during adsorption may be about 0-about 70° C., preferably about 15-about 50° C. Generally, the adsorption temperature is above the hydrocarbon dew point or the temperature of hydrate formation. Typically, the feed gas passes through the third adsorber 150 in generally a downflow direction.

The purified natural gas product can exit the adsorber in a line 28. The line 28 can be split into the lines 30 and 32 and the purified natural gas product can pass into a plurality of filters 40 including a first filter 42 and a second filter 44 for removing one or more particulates having a diameter greater than, e.g., about 10 microns, from the purified natural gas product. The filtered product gas can exit the lines 46 and 48 from respective filters 42 and 44 and be combined in a line 50. In another exemplary embodiment, the filters 42 and 44 can be operated alternatively with one filter removing particles and the other filter off-line. A part can be split in a line 52, as hereinafter described, and another portion can be recovered as product in a line 54. The product gas then can be in a suitable condition for subsequent processes, such as liquefaction.

The portion of the filtered product gas provided at "A" via the line 52 can be combined with the recirculated regeneration gas from a line 224, as hereinafter described, in a line 56. The gas in the line 14 and the combined gases in the line 56 can be communicated to the heating regeneration circuit 60 for regenerating one or more adsorbers. Thus, the regeneration gas may include the purified natural gas product from the line 52 combined with the recirculated regeneration gas in the line 224 and combined with a portion of the feed gas from the line 14. Particularly, the regeneration may occur in the heating regeneration circuit 60 and in the cooling regeneration circuit 250. Subsequently, the gas can be combined in a line 58 and enter a first dryer 80 of the plurality of dryers 70. Each dryer 80 and 90, can, independently, have an adsorbent, such as a molecular sieve, as described above for the plurality of adsorbers 120. The first dryer 80 can remove water from the combined gas to provide a gas suitable for regenerating. Generally, the first dryer 80 can reduce the amount of water to no more than about 10 ppm, by volume, preferably about 0.1 ppm, by volume, water based on the volume of gas in the line 82. Afterwards, the gas can exit the first dryer 80 and enter the line 82.

The regeneration gas in the line 82 may enter the heater 100 using any suitable heat source, such as a furnace, an electric heater, a heat exchanger, or any combination thereof. As an example, a heat exchanger may use any suitable heating fluid stream 102, such as pressurized steam, which may be followed by a subsequent heater, such as an electric heater. The heated gas can exit in a line 104 at a temperature of about 120-about 320° C., preferably about 120-about 300° C. The pressure is generally the same as described above.

The gas can enter the first adsorber 130 of the plurality of adsorbers 120, typically in another or opposite direction, e.g., upflow, as gas entering the first adsorber 130 in the adsorption stage. During the heating stage, the gas regenerates the first adsorber 130 by incrementally raising the temperature over time of the first adsorber 130 typically until a predetermined temperature setpoint is reached. Once the desired raised temperature is reached, noncondensable contaminants, such as carbon dioxide and/or water, are released from the adsorbent. Other components may also be desorbed, such as hydrogen sulfide. Generally, a portion of the feed 12 can be utilized as a regeneration gas due to the elevated temperature of regeneration and the comparable high level of carbon dioxide circulating in the heating regeneration circuit 60. Often, the gas can enter into the adsorber 130 in a generally upflow direction.

The gas including the contaminants may exit the first adsorber 130 and enter a line 160 to the cooler 170, which can be a single air cooler 170, optionally followed by another exchanger, such as a process or a cooling water exchanger. The air cooler 170 can lower the temperature of the gas exiting the adsorber to condense heavier hydrocarbons and water. The gas may exit the air cooler 170 and enter a line 172 to the knockout drum 180.

The knockout drum 180 can contain a demister 182 with a line 184 for draining condensate, typically including water, and a line 186 for removing gas. The gas in the line 186 can be split into a purge stream in a line 190 and the recirculating regeneration gas in a line 200. The gas in the line 200 can be provided to a suction of a compressor 220 and discharged in a line 224. As discussed above, the discharged gas can be combined with the feed gas in the line 14 and a filtered natural gas product in the line 52 to comprise the regeneration gas.

While the first adsorber 130 is undergoing the heating stage of regeneration, the second adsorber 140 can undergo the cooling stage of regeneration. Thus, once the second adsorber 140 undergoes the heating stage, it can undergo the cooling stage to place the adsorber in condition for an adsorption stage, as depicted by third adsorber 150.

At the initiation of cooling, heated gas exiting the second adsorber 140 can enter a manifold by passing through a line 162 and pass an opened valve 164 to "B". The gas can then pass through a line 252 and through an opened valve 254. Next, the gas can pass to a compressor 260 in the cooling regeneration circuit 250. Once pressurized, the cooling gas can pass through a line 262 to the second adsorber 140. Initially, a hot fluid, typically gas, can be present in the second adsorber 140 from the heating stage of regeneration. The gas may pass downward through the second adsorber 140 to a line 264. In this exemplary embodiment, the gas entering the second adsorber 140 can be in another or opposite direction, e.g., generally downflow, as compared to the heating stage. Initially, a valve 276 can be closed and a valve 266 may be open. The hot gas can pass through a line 268 into the second dryer 90. Generally, the second dryer 90 is utilized to remove water from the purge gas during the heating stage of regeneration. Pushing the hot gas from the second adsorber 140 can desorb water from the sieve in the second dryer 90 into a line 270. Afterwards, the gas can pass from a line 278 into a cooler 280, which can be an air cooler 280. Optionally, the air cooler 280 may be followed by another exchanger, such as a process or a cooling water exchanger.

The air cooler 280 can cool the gas that may pass into a line 282 to the knockout drum 290. The knockout drum 290 can contain a demister 292 and provide a condensate, typically water, in a line 296 and gas passing to a line 294. The gas can enter the line 258 into the compressor 260 and recirculated in a closed loop, minimizing material and energy losses.

As the gas is circulated, the cooled gas at a temperature of about 10-about 70° C., can pass from the second adsorber 140 to the second dryer 90. Once the second dryer 90 is cooled, the valve 266 can be closed and the valve 276 may be opened to bypass the second dryer 90 by allowing the gas to pass through a line 274 to speed the cooling of the second adsorber 140 and minimize energy consumption. Once the cooling stage is completed, the second adsorber 140 can be suitable for adsorption to produce a purified natural gas product.

Although individual pieces of equipment, such as heaters, coolers, vessels, and rotating machines, are depicted, it should be understood that such depictions can denote a plurality of such equipment of optionally varying type. As an example, a depicted air cooler can denote a plurality of coolers, such as air, process, and cooling water exchangers.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing, all temperatures are set forth in degrees Celsius and, all parts and percentages are by weight, unless otherwise indicated.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A process for purifying a natural gas by using first and second adsorbers, comprising:
   A) passing a feed comprising the natural gas through the first adsorber to obtain a purified natural gas product;
   B) regenerating the second adsorber in a heating stage, wherein the heating stage comprises:
      1) separating a portion of the feed comprised in a regeneration gas;
      2) passing the regeneration gas to a dryer for removing water;
      3) heating the regeneration gas with a heater after exiting the dryer; and
      4) passing the regeneration gas to the second adsorber to regenerate the second adsorber; and
   C) regenerating the second adsorber in a cooling stage, wherein the cooling stage comprises:
      1) expelling at initiation of cooling at least a part of a fluid present in the second adsorber to the dryer to desorb water from an adsorbent in the dryer; and
      2) cooling the second adsorber by circulating the regeneration gas bypassing the heater.

2. The process according to claim 1, wherein the natural gas comprises at least about 70%, by mole, of at least one of methane and ethane.

3. The process according to claim 1, wherein the natural gas comprises at least about 95%, by mole, of methane.

4. The process according to claim 1, wherein the natural gas comprises no more than about 2%, by mole, carbon dioxide.

5. The process according to claim 1, wherein the natural gas comprises no more than about 0.5%, by mole, carbon dioxide.

6. The process according to claim 1, wherein the natural gas comprises no more than about 7,500 ppm, by volume, water.

7. The process according to claim 1, wherein the natural gas comprises no more than about 500 ppm, by volume, water.

8. The process according to claim 1, wherein the regeneration gas comprises at least about 70%, by mole, of at least one of methane and ethane.

9. The process according to claim 1, wherein the regeneration gas comprises at least about 95%, by mole, of methane.

10. The process according to claim 1, wherein the regeneration gas comprises no more than about 2%, by mole, carbon dioxide.

11. The process according to claim 1, wherein the regeneration gas comprises no more than about 0.5%, by mole, carbon dioxide.

12. The process according to claim 1, wherein the first and second adsorbers contain an adsorbent.

13. The process according to claim 12, wherein the adsorbent of the first and second adsorbers comprises a zeolite.

14. The process according to claim 1, wherein the regeneration gas further comprises the purified natural gas product.

15. The process according to claim 1, wherein the first adsorber operates at a temperature of about 10-about 70° C. and a pressure of about 600-about 12,000 kPa during adsorption.

16. The process according to claim 1, wherein the second adsorber operates at a temperature of about 120-about 320° C. and a pressure of about 600-about 12,000 kPa during regeneration in the heating stage.

17. The process according to claim 1, further comprising liquefying the purified natural gas product.

* * * * *